United States Patent [19]

Nedelec et al.

[11] 4,292,065

[45] Sep. 29, 1981

[54] METHOD AND APPARATUS FOR SHAPING THERMOPLASTIC SHEET MATERIAL

[75] Inventors: Maurice Nedelec, Versailles; Claude Presta, Courbevoie; François Vitoux, Thourotte, all of France

[73] Assignee: Saint Gobain Industries, Neuilly-sur-Seine, France

[21] Appl. No.: 97,683

[22] Filed: Nov. 27, 1979

[30] Foreign Application Priority Data

Nov. 27, 1978 [FR] France .................. 78 33478

[51] Int. Cl.³ ............................................ C03B 23/025
[52] U.S. Cl. ...................................... 65/104; 65/106; 65/107; 65/268; 65/273
[58] Field of Search ............... 65/106, 107, 268, 273, 65/104

[56] References Cited

U.S. PATENT DOCUMENTS

| | | | |
|---|---|---|---|
| 3,409,422 | 11/1968 | Gulotta | 65/25 |
| 3,545,951 | 12/1970 | Nedelec | 65/107 |
| 3,778,244 | 12/1973 | Nedelec et al. | 65/106 |
| 3,782,916 | 1/1974 | Powell et al. | 65/104 |
| 3,799,752 | 3/1974 | Cheron | 65/104 X |
| 3,801,298 | 4/1974 | Bezombes | 65/104 |
| 3,831,239 | 8/1974 | Hoff et al. | 65/106 X |
| 4,015,968 | 4/1977 | Reuells et al. | 65/273 X |
| 4,054,437 | 10/1977 | Ueberwolf et al. | 65/107 |
| 4,054,438 | 10/1977 | Presta | 65/107 |
| 4,123,246 | 10/1978 | Johnson | 65/104 |
| 4,139,359 | 2/1979 | Johnson et al. | 65/106 X |
| 4,210,434 | 7/1980 | Galindez | 65/106 X |

FOREIGN PATENT DOCUMENTS

2221409 10/1974 France .

Primary Examiner—Arthur D. Kellogg
Attorney, Agent, or Firm—Pennie & Edmonds

[57] ABSTRACT

A method and apparatus are described for bending sheets in the plastic state, such as sheets of glass at their softening temperature, in two directions. The apparatus comprises a first bed of arcuate rods which can be positioned to impart a transverse curvature to the sheet and a second bed of arcuate rods which can be positioned to impart a longitudinal curvature to the sheet. Advantageously the bending is performed in a heated enclosure at a temperature at least equal to that at which the sheet is later tempered.

25 Claims, 6 Drawing Figures

METHOD AND APPARATUS FOR SHAPING THERMOPLASTIC SHEET MATERIAL

TECHNICAL FIELD

The present invention relates to the bending and tempering of sheets in the plastic state, such as glass sheets heated to their softening temperature. While the invention is described with respect to the bending and tempering of glass sheets, it will be understood that the invention may be applied to other materials as well.

BACKGROUND OF THE INVENTION

Glass sheets may be bent and tempered at high production rates on a bed of arcuate forming rods. In this process individual glass sheets are conveyed without stopping through heating, bending and tempering zones on high speed glass sheet conveyors.

The apparatus for shaping the glass sheets comprises a series of forming rods each of which has a central section curved to a desired arcuate form. On each side of the curved section there is a straight section of rod, the two sections being aligned with each other on an axis which is a chord of the arcuate section of the rod. Suitable bearings permit rotation of the rod on this axis. The individual rods are mounted in a frame so that their axes are parallel and extend transversely of the direction of travel of the glass sheets. Typically, the rods are interconnected for pivoting in unison, each about its own axis, from a first position wherein the curved sections and rotational axes of all the rods lie in a common plane to a second position wherein the curved sections conjointly define a curved surface whose transverse curvature varies with the angle of rotation of the rods.

Each curved forming rod is surrounded by a tubular sleeve or roll made of stainless steel which possesses substantial torsional strength but is flexible in its axial direction. The sleeve is rotatably mounted on the curved rod to permit rotation regardless of the inclined position of the curved rod. The sleeve is coupled at one end to a pinion which is connected to suitable drive means. As a softened glass sheet is advanced over such rolls, it assumes the shape of the surface defined by the rolls. This shaping of the sheet may be effected either by gravity when the softened glass sheet sags under its own weight or by pressure applied by a counterform. The details of different types of such forming apparatus are set forth in U.S. Pat. Nos. 3,545,951, 4,054,437 and 4,054,438, all of which are incorporated herein by reference. Details of the construction of the rolls are set forth in U.S. Pat. No. 3,831,239 which is likewise incorporated herein by reference. As will be apparent from these patents transverse curvatures may be formed in glass sheets either by raising the central portion of the sheet as in the '951 and '437 patents or by lowering the outer edges of the sheet as in the '438 patent.

The foregoing systems are very satisfactory if the glass is to be bent in one direction only. They are not suitable, however, for producing glass sheets having a compound curvature composed of curves extending in two directions, such as are used in the automotive market.

Apparatus for forming glass sheets with compound curvatures extending both transversely and longitudinally of the sheet is described in U.S. Pat. No. 3,409,422. Such apparatus uses a gas support bed for the glass sheet. The apparatus, however, requires long and difficult adjustments in order to change the radii of curvature of the sheets.

DISCLOSURE OF THE INVENTION

The present invention is directed to a method and apparatus that is suitable for the production of glass sheets with all possible curvatures in two directions and provides for simple and fast changes in the direction of curvature and/or the radius of curvature of the sheet.

Preferably, the apparatus comprises a first bed of arcuate rods which can be positioned to impart a transverse curvature to the glass sheet and a second bed of arcuate rods which can be positioned to impart a longitudinal curvature to the glass sheet. Advantageously, the first bed is similar to that disclosed in U.S. Pat. No. 4,054,438 and has two portions: a transition portion in which the arcuate rods are set at progressively greater angles of inclination to the direction of travel of the glass sheet and a fixed portion in which the arcuate rods are all set at the same angle of inclination required to give the sheet the desired transverse curvature. As detailed in the '438 patent, the angle of inclination of the rods in the first bed and therefore the transverse curvature of a glass sheet can readily be adjusted by a series of mechanical linkages and jacks. The second bed of arcuate rods comprises an array of rods similar in shape and set at the same angles as those in the fixed portion of the first bed but mounted on a surface having a curved longitudinal profile corresponding to the desired longitudinal curvature. Thus, the second set of rods have progressively different heights relative to the height of the fixed portion. In accordance with the invention, the surface or envelope defined by the second bed of rods is tangent to the surface or envelope defined by the first bed of rods. As a result, the glass sheets are made to follow a continuous smooth path from the heating zone, through the bending zone, to the tempering zone. Throughout this path the rolls supporting the glass sheet are positioned so that any change in the radius of curvature of the glass sheets in the longitudinal and transverse directions is continuous.

In one embodiment of the invention the rods in the second bed are rotatably mounted on longitudinally positioned leaf springs. By use of tie rods attached to their ends, these springs can be arched about an axis which is transverse to the direction of travel of the glass sheet. As a result, the height of the rods in the second bed and hence the longitudinal curvature of a glass sheet shaped thereon can readily be adjusted by adjustment of the length of the tie rods. Preferably, in order to permit bending of the glass into any shape, the leaf springs can be arched individually and their concave side can point either up or down.

In another embodiment the function of the first and second beds of arcuate rods can be combined into one by mounting the rods of the first bed on a pair of bars which are curved in the longitudinal direction instead of straight as in the '438 patent. As will be apparent, in such a configuration some rods will be inclined at different angles to the direction of travel of the glass sheet and some rods will be at progressively different heights. Again, in this embodiment, the bed must be aligned with the conveyors from the glass furnace so that there is a smooth transition from one to the other, i.e., so that the surface over which the glass sheet is advanced has a radius of curvature which changes continuously instead of abruptly in both the longitudinal and transverse directions.

Preferably, in both of these embodiments, a counter rod is associated with each arcuate forming rod mounted at a different height and the glass sheet passes in between. Each counter rod is elastically pressed against the glass sheet and is positioned forward or backward of the arcuate rod.

After the bending zone, the glass sheets pass through a tempering zone where the glass is carried on rods which identical shape and orientation as the last rod of the bending zone. Further, these carrying rods in the tempering zone are mounted on supports so that they are aligned along the identical curves as the rods in the second bed in the tempering zone. Counter rods are associated with at least some carrying rods and are mounted in opposition to said rods. Between the carrying rods and counter rods are located cooling nozzles which temper the glass with a uniform air flow.

To prevent overheating of the glass and to hold the glass at a uniform temperature, the bending zone is advantageously located inside a heated enclosure. This enclosure can be the glass heating furnace or a heating chamber separate from the glass heating furnace. It might even be partly the heating furnace and partly a separate heating chamber. Preferably the heated bending enclosure and the glass heating furnace are contiguous so that the glass is maintained at the desired temperature without being subjected to the uncontrolled temperature variations of open air. Advantageously, the bending of the glass sheets is performed at a temperature only a little bit higher (approximately ten degrees C.), than the temperature of the glass at the start of the tempering process, and the glass sheets are transported to the tempering zone immediately after bending.

This method saves energy, prevents overheating which may hurt the optical characteristics of the glass sheets produced, and ensures uniform glass temperature before tempering. Such uniform glass temperature and uniform cooling during tempering produces better tempering of the glass panes.

While the preferred embodiment provides for the production of glass sheets having compound curvature, the invention may also be practiced in forming sheets having only a longitudinal curvature. In such case, the forming rods can be straight instead of curved and the first bed of rods can be eliminated entirely.

BRIEF DESCRIPTION OF THE DRAWINGS

These and other objects, features and elements of our invention will be more readily apparent from the following detailed description of our invention in which.

BEST MODE FOR CARRYING OUT THE INVENTION

Figure 1:
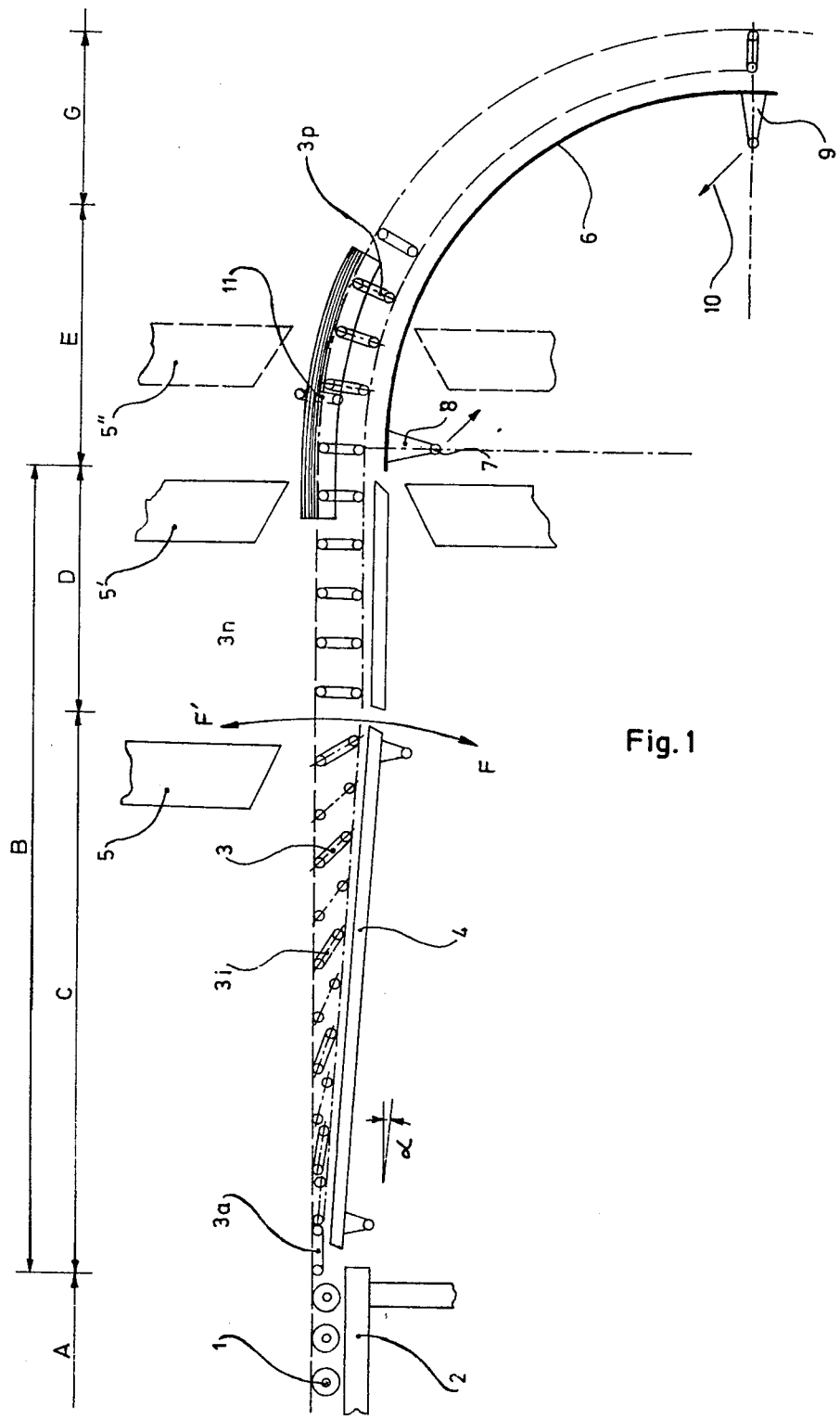
FIG. 1 is a side view of an illustrative embodiment of a sheet bending and tempering machine of our invention.

FIG. 1 depicts an illustrative embodiment of a bending and tempering machine according to the invention in which softened glass sheets are shaped to compound curvatures and tempered. The apparatus shown in FIG. 1 comprises four zones through which glass sheets 30 are successively conveyed on a conveyor system: zone A, where the glass is heated; zone B comprising subzones C and D in which transverse curves are progressively formed in the glass sheets, as described in detail in U.S. Pat. No. 4,054,438; zone E in which longitudinal curves are formed; and zone G in which the sheets are tempered. The direction of travel of the glass sheets is indicated by arrows H.

In zone A, which illustratively is the distal end of a glass heating furnace, a plane sheet of glass moves on conventional furnace rolls 1 made, for example, of silica and supported by frame 2.

A transverse curvature is produced in a glass sheet 30 by a first bed of arcuate forming rods 3 having a transition portion (subzone C) and a fixed portion (subzone D). Each rod has a central curved section with straight sections on either side of it. The two straight sections are aligned with each other on an axis which is a chord of the arcuate section of the rod; and suitable bearings permit rotation of the rod on this axis. The individual rods are mounted on parallel supports on either side of the glass sheet conveyor system so that their axes are parallel and extend transversely of the direction of travel of the glass sheet. In the transition portion, the arcuate rods are set at progressively greater angles of inclination to the direction of travel of the glass sheet. Thus, the first rod, 3a, lies in the plane which is tangent to the upper surfaces of furnace rolls 1; and the following rods, such as 3i, are inclined more and more to this plane. As disclosed in the '438 patent, the amount of progressive inclination can advantageously be adjusted by means of a series of cranks and jacks. This adjustment apparatus is schematically illustrated in FIG. 1 by a bar 4. As will be apparent from the '438 patent, the angle of inclination is changed by lowering the bearings in which the rods rotate while maintaining the apices of all of the rods in the plane tangent to the upper surfaces of furnace rolls 1. Thus, the apices of rods 3i are all at the same height relative to one another. Since the change in angle of inclination is progressive, there is a smooth change in the radius of curvature of the glass sheet in the transverse direction as it moves through the transition portion.

In the fixed portion (zone D), arcuate rods 3n are all set at the angle of inclination which is required to give the sheet the desired transverse curvature and the apices of these rods all lie in the plane tangent to the upper surface of furnace rolls 1. While the rods in zone D of FIG. 1 are shown as perpendicular to the direction of travel of the glass sheet, which produces maximum curvature, the rods may also be set at smaller angles as desired. As is also described in the '438 patent, this angle can be adjusted as necessary by another series of mechanical linkages coupled to the adjustment apparatus for the rods in the transition portion. This adjustment apparatus is schematically represented in FIG. 1 by the continuation of bar 4 into subzone D.

Each forming rod is surrounded by a tubular sleeve or roll (not shown) made of stainless steel and mounted to permit rotation on the rod regardless of the inclined position of the rod. The rolls are driven by a mechanical linkage on one side of the conveyor system so as to move glass sheets through the apparatus of FIG. 1 in the direction shown by arrows H. Details of such rolls are set forth in U.S. Pat. No. 3,831,239.

Preferably the apparatus of subzones C and D is located inside one or more heated enclosures. This enclosure could be an independent heating chamber or the glass heating furnace. Thus, by way of example, the wall of the heating furance could be between subzones C and D as represented by wall 5 or between zones B and E as represented by wall 5'.

To permit the use of bending apparatus in a heated enclosure, it is desirable that the forming rods be internally cooled. Suitable such rods and the details of such a bending process are set forth in U.S. Patent Application Ser. No. 028,175, assigned to the assignee hereof. Advantageously, the same type of forming rod may be used in both the transition portion and the fixed portion of the first forming bed.

In zone E, a second bed of arcuate forming rods 3p is used to produce a longitudinal curvature in the glass sheet. Arcuate rods 3p are identical to rods 3i and 3n, are enclosed in similar sleeves or rolls (not shown), and are set at the same angle of inclination relative to the direction of travel H of the glass sheet as rods 3n in the fixed portion of the first bed. In addition, however, the bearings in which the rods rotate are mounted on a pair of curved supports located on opposite sides of the path in which the glass sheets are moved. Thus, rods 3p are at different heights relative to one another and at different distances from the plane tangent to the upper surface of furnace rolls 1. Illustratively, curved supports 6 are leaf springs.

On the upstream side of the second bed (i.e., at the interface between zones B and E) these leaf springs are attached at an anchoring point 7 which is in a fixed position relative to the downstream end of bar 4. This point 7 is so located that the envelope defined by the second bed of forming rods 3p is tangent at the interface between zones B and E to the envelope defined by the rods 3n in the fixed portion of the first bed. Thus, when leaf springs 6 are at rest, i.e. straight, the bed formed by forming rods 3p is an extension of the supporting means for the glass immediately upstream, without any break or sharp angle at the interface. Each end of leaf springs 6 further comprises an anchoring means 8, 9 to which is attached on adjusting means 10 for changing the curvature of said leaf springs. Preferably the downstream ends of leaf springs 6 are held by supports (not shown) whose position can be adjusted in the vertical and longitudinal direction to follow the movements of the end of the leaf spring when the curvature is changed.

Counter rods 11 are provided above forming rods 3n, at a position slightly forward or backward of said forming rods. The counter rods have approximately the same transverse profile as the forming rods and are spaced apart from said forming rods enough to permit the passage of glass sheets 30 therebetween. These counter rods improve the shaping of the front and rear edges of the glass sheets because they prevent the forming of flat spots. Illustratively, counter rods 11 are arched rods of the same type as rods 3p, can be raised in the same manner and are mounted in sliding bearings which are elastically pulled toward the bearings of rods 3p so that they lightly squeeze the glass sheets. The counter rods can be in direct contact with the glass sheets, as described above, or may carry one or several rolls which alone are in contact with the glass. In another embodiment the counter rods or the counter rods carrying rolls may be replaced by independent rolls pressed elastically against the glass.

Preferably, the zone for heating the glass may extend to the end of zone E. In certain cases, the wall of the furnace may even extend to wall 5" so that the furnace includes the longitudinal forming zone E. This eliminates loss of heat during bending, improves the optical characteristics of the glass and ensures uniform temperature which results in better tempering.

Advantageously, the leaf springs 6 which support the bearings of rods 3p should be turned downward, an arrangement which ensures minimum wear of rods 3p and of the rolls in which they are encased; but they can also be turned upward. In the same manner the concave side of the arcuate forming rods 3a, 3i, 3n and 3p preferably is on the bottom, but it can also be on top. It is thus possible not only to change the radius of curvature in the two directions in which the glass may be bent, but also to select the direction of curvature. FIG. 1 shows that the path of the sheets of glass on the rolls 1 in the furnace, on rods 3a, 3i, 3n, 3p in the bending zone and finally in tempering zone G, has a smooth profile without breaks. In the transverse and longitudinal directions, the radius of the curvature varies continuously from infinite in the heating furnace to a value which may be less than 1 meter in zones E and G.

Figure 2:
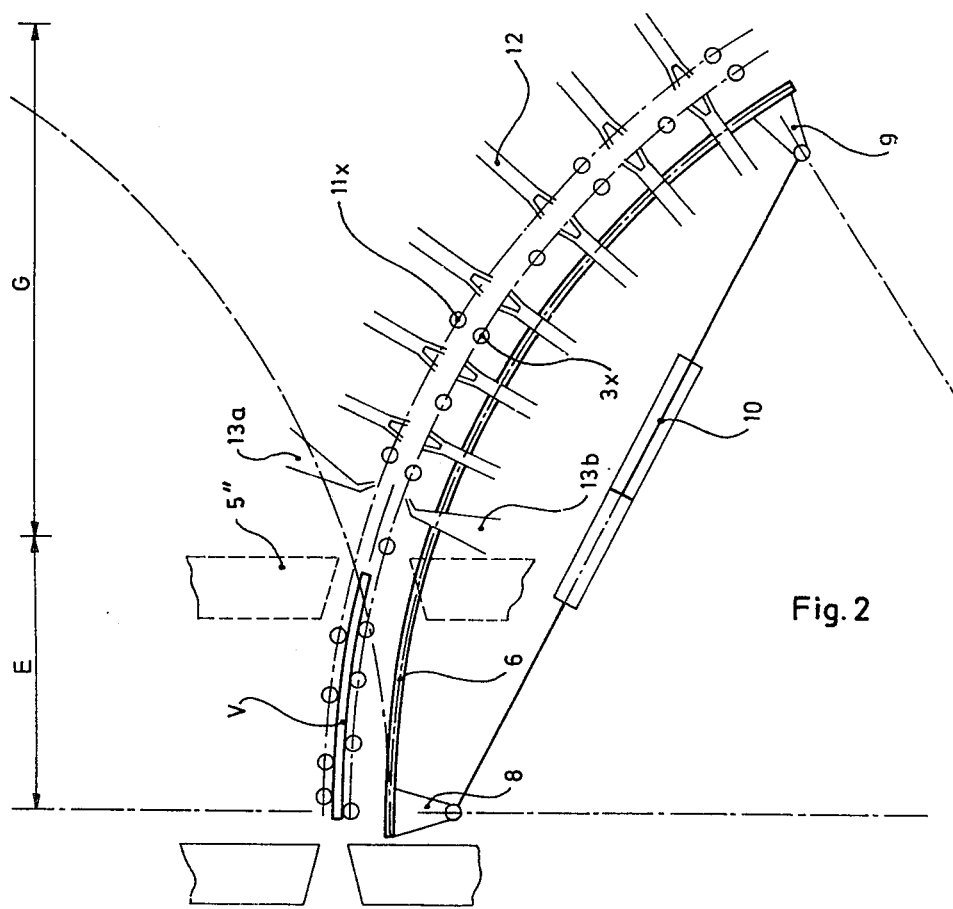
FIG. 2 is a detailed side view of a portion of the apparatus of FIG. 1.

FIG. 2 shows in more detail tempering means not shown in zone G of FIG. 1. The tempering means comprises a third bed of arcuate rods 3x, identical with rods 3p and 3n and inclined at the same angle with respect to the direction of travel H of the glass sheets. The bearings in which these rods rotate are mounted on the last part of the pair of curved supports 6 so that the curvature in the tempering zone G is the same as in Zone E. Counter rods 11x, identical in shape with the counter rods 11 used in zone E, are mounted so that they are directly opposite rods 3x, i.e., they are not shifted in the longitudinal direction relative to rods 3x.

Between rods 3x and counter rods 11x on both sides of the glass sheet are located blowing means such as double nozzles 12, as shown in FIG. 2. These nozzles are individually supplied through flexible hoses (not shown) or through tanks (likewise not shown). Except for the first pair of nozzles 13a, 13b, the nozzles are positioned perpendicularly to the surface of the glass which passes by on the rods and are mounted on parts supported by the bearings in which rods 3x rotate or are mounted directly on leaf springs 6. Therefore, regardless of the curvature given to said leaf springs, the nozzles will maintain their perpendicular blowing position in relation to the glass sheets; and their orifices will always be at the same distance from the glass. Uniform and well controlled blowing is thus ensured. The orifice of nozzles 13a, 13b preferably is directed toward the interior of zone G, so that the air flow does not cool and disturb the longitudinal forming zone E which is immediately upstream. Advantageously, when rods 3x are arched, the blowing nozzles will be arranged in several articulated sections, as described in U.S. Pat. No. 3,799,752, which is incorporated herein by reference, preferably with partial covering of the area near these articulations in order to avoid non-uniform blowing in these areas.

In order to eliminate too many changes in height and length in the apparatus of FIG. 1 whenever the longitudinal curvature must be changed, it is desirable to place as few components as possible on the adjustable curved profile. Only the bending means and the tempering means absolutely necessary for establishing the temperature differential between the skin and the core of the glass and for making the glass rigid should be put on the adjustable curved portion; and additional cooling means should be located on structures placed downstream of the leaf springs.

For the type of equipment shown in FIGS. 1 and 2, several alternatives are available for removing the glass sheets at the discharge of the tempering section. For example, the bent glass sheets could fall in free fall into a vat filled with a fluid with a good heat exchange coefficient, for example oil or molten salt. An inclined conveyor would then remove the sheets from the vat. Alternatively, a horizontal conveyor may be used with a soft surface suitable for receiving the glass sheet which drops in free fall from the last pair of a rod 3x and a counter rod 12. Such a conveyor would transport the glass sheet between two conventional air-blowing manifolds. As another possibility, the leaf springs could be extended to form a complete half-circle equipped with rods and counter rods for transporting the glass sheet past air-blowing manifolds the delivering them to a horizontal conveyor with an adjustable access ramp located under the infeed of the bending and tempering machine.

Figure 3:
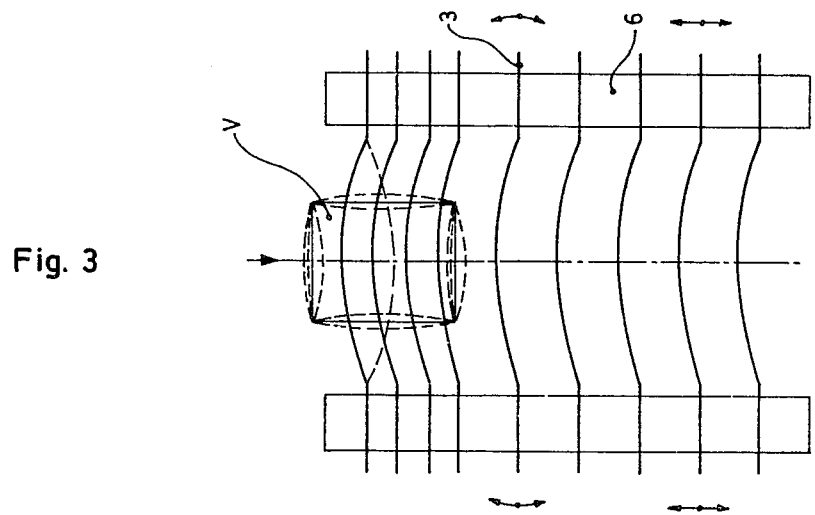
FIG. 3 is a top view helpful in understanding the apparatus of FIG. 1.

FIG. 3 shows a top view of a bending device with a glass sheet V just being bent. The dotted outlines of glass sheet V indicate all possible shapes which it may take. Rods 3 may be turned upwards and the sheet will then take a curvature whose concave side faces downward. Rods 3 may, on the contrary, be turned down in which case the concave side of the sheet will face upward. If leaf springs 6 are lowered, the concave side of the longitudinal curvature will face downwards; and if the leaf springs are raised, the concave side of the glass sheet in the longitudinal direction will face upwards. In addition, each of the leaf springs 6 can be given a different curvature, in which case the glass sheet will have a warped double curvature.

Figure 4:
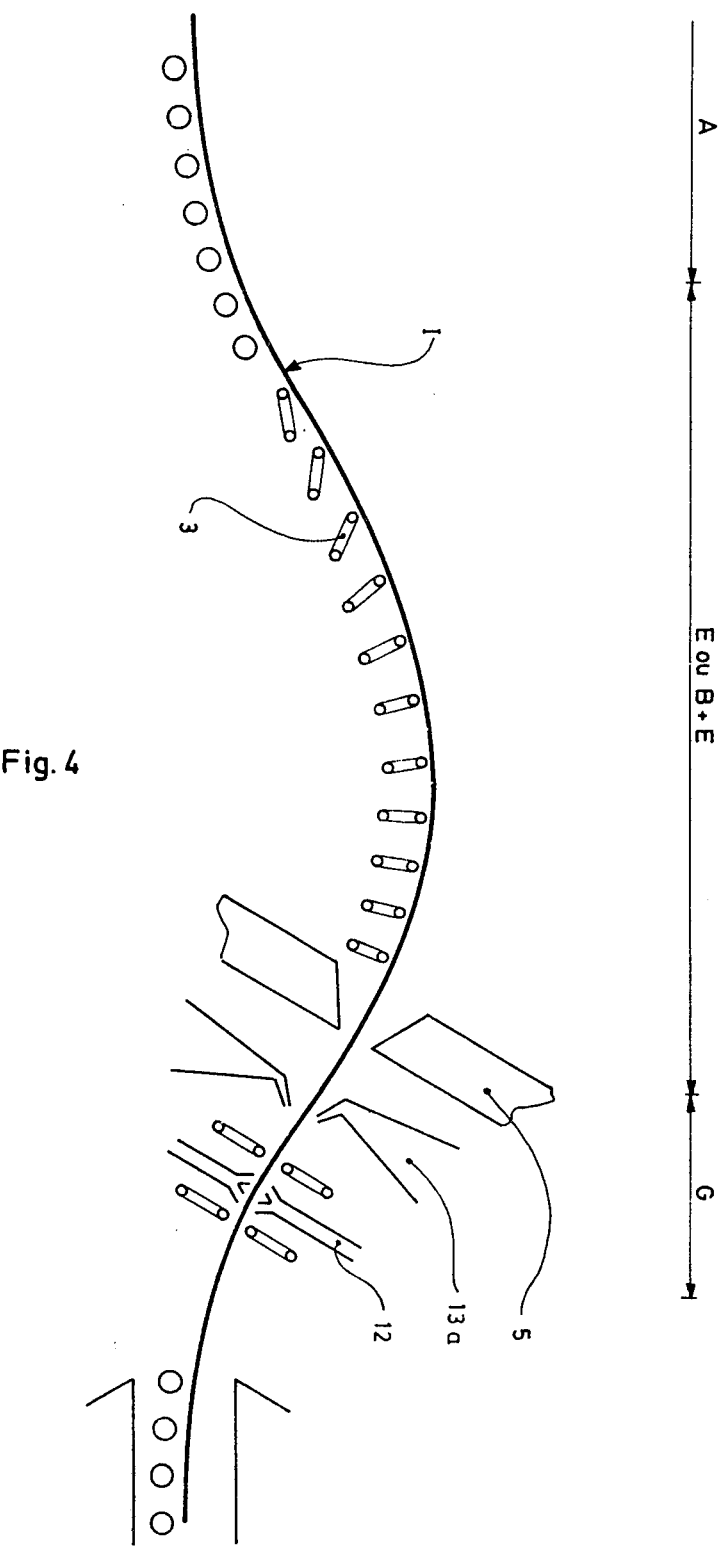
FIG. 4 is a side view of a portion of a second illustrative embodiment of a sheet bending machine of our invention.

FIG. 4 shows another arrangement of the bending zone. In order to facilitate the disposal of the glass sheets at the discharge end of the bending and tempering apparatus, the bending assembly is tilted upwards in a "donkey's back" configuration. The construction of the beds of arcuate rods required to produce transverse and longitudinal curvatures in glass sheets on such equipment will be apparent from the foregoing description and will not be repeated. With such a configuration it is possible to take off the bent and tempered glass sheets on a horizontal conveyor, approximately at the same level as the conveyors in the glass heating furnace. The length of the device is not critical. After the tempering zone G in which the required temperature differential is created between the skin and the core of the glass and in which the glass is made rigid enough so that it does not deform anymore, a cooling zone can be provided on an extension of the curved profile. Such a cooling zone reinforces the tempering action by maintaining this temperature differential, so that no stress relief takes place.

In order to prevent the occurrence of defects which appear in the front edge of the sheet when it passes over a sharp angle, the track of these conveyors is changed to give it a slight slope so that it arrives at point I at a tangent to the surface of the forming device. This modification of the slope of the conveyor in the heating furnace can be made long in advance of the interface between zones A and B of FIG. 4. The main point is that there should be no sharp break in the path of the glass while it is in the plastic state. If necessary, the heating furnace can be extended or a heated enclosure can be added at the discharge end of the furnace to increase the amount of space available for modifying the slope of the path of the glass. A longer furnace or an additional heated enclosure at the discharge end of the furnace will make it possible to lengthen and improve the heating of the glass. Such increase in the heating time makes the temperature of the glass more uniform and this greater uniformity, together with a well operated tempering operation, makes it possible to meet safety standards for tempered glass.

Figure 5:
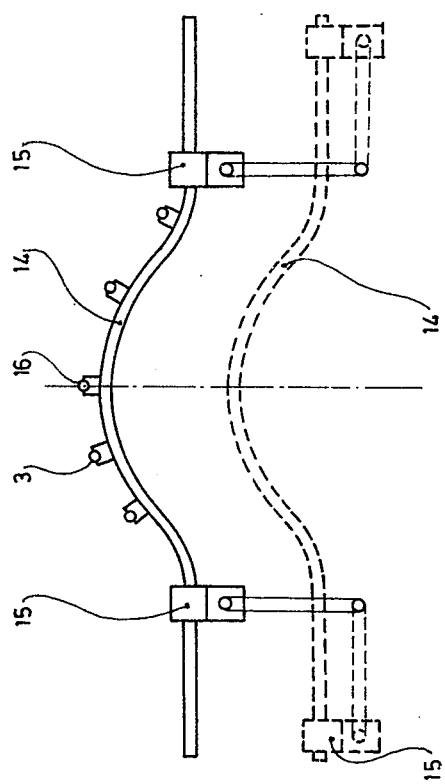
FIG. 5 is a side view of alternative means for producing a longitudinal curvature.

While the supports for the forming rod bearings can be leaf springs, they may also consist of one or more of the systems described below and shown in FIGS. 5 and 6. As shown in FIG. 5, one of these systems consists of at least one pair of arched bars 14 which are positioned longitudinally one on each side of the glass sheet conveyor system. The bars have a "donkey's back" profile. The two ends of each of these bars lie on the same centerline and each bar can be positioned at various angles by rotating it in bearings 15 around the common centerline of the ends. Each of these bars 14 carries sliding bearings 16 which in turn support the ends of forming rods 3 which extend in a direction perpendicular to the centerline of bar 14. The longitudinal curvature of the forming bed can therefore be changed, by changing the angular position of arched bars 14.

This longitudinal curvature will be zero when the pairs of bars are lying in the same plane perpendicular to the plane of the drawings of FIG. 5. It will be at the maximum value, equal to the curvature of bars 14 themselves, when both bars in a pair are raised at right angles in relation to the plane in which they were lying before. Thus, in a manner similar to that applying to leaf springs 6, one can vary the height of arcuate rods 3p to alter the radius of curvature of the glass sheet in the longitudinal direction. Like the leaf springs 6, the two bars 14 can be set at different angular positions, which results in a warped longitudinal curvature.

Figure 6:
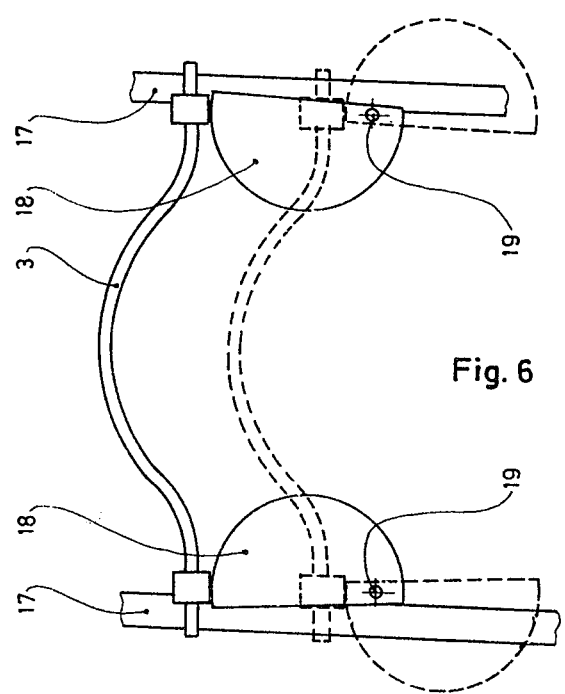
FIG. 6 is a front view of a cam system for changing the height of the forming rod bearings.

As shown in FIG. 6, another way to modify the profile of the longitudinal curvature is to mount the bearings for the forming rods 3 in slides 17 extending along either side of the conveyor on which the glass sheet advances. Each of said bearings rests on a cam 18. By turning the cam its associated bearing is raised or lowered, thereby changing the vertical position of the rod mounted in said bearing. All cams can be controlled by one single shaft 19, or they can be controlled individually. Cams 18 should have different profiles which are determined by the range of curvatures which are to be obtained.

It is, in addition, possible to combine the leaf springs of the embodiment of FIG. 1 or the arched bars of the embodiment of FIG. 5 with the system consisting of slides 17 and cams 18. The slides and cams can then be used to change the curvature of the forming bed which is formed by the springs or arched bars, without touching the adjustments of said springs or arched bars. One can, for example, obtain a sharper longitudinal curvature than that which can be obtained with the maximum setting of the arched bars.

While the apparatus described above provides for transverse bending and longitudinal bending in sequence, it is also possible to perform both bending operations simultaneously. This can be achieved by combining into one bed the forming rods 3a through 3n of the first bed of the apparatus of FIG. 1 and the rods 3p of the second bed. More specifically a single bed of forming rods may be constructed in which some rods may be inclined at different angles to the plane tangent to the upper surface of furnace rolls 1 and the apices of some rods may be at progressively different distances from said plane. With reference to FIG. 2 of the '438 patent, such longitudinal curvature can be achieved in conjunction with transverse curvature by making beams 4 and guide path 22 of the '438 patent flexible and providing means for curving them about an axis transverse to the direction of travel of the glass sheets.

If desired, any of the foregoing embodiments may be modified by eliminating the apparatus of zone B that is used to produce transverse curvature. In this case forming rods 3p are then positioned so that they are in a curved surface parallel to the surface defined by leaf springs 6. Of course, to prevent defects in the leading edge of the glass sheet, it is necessary that the envelope defined by rods 3p be tangential to the surface on which the glass sheet is conveyed on the upstream side of the bed of forming rods. In the absence of the apparatus of zone B, this requires that the envelope be tangent to the upper surface of furnace rolls 1 at the interface between zones A and E. Since there is no transverse curvature in the glass sheets, it is also possible to replace the arcuate rods 3p by straight rolls.

As will be apparent numerous modifications may be made in the above described embodiments without departing from the spirit and scope of the invention. Various alternatives will be apparent for mounting arcuate rods 3 and nozzles 12 and 13 or adjusting their inclination and their height. For example, to permit individual adjustment of the rod bearings and the nozzles, the bearings and nozzle supports can be mounted on threaded bolts attached to a rigid frame.

What is claimed is:

1. Apparatus for bending to a predetermined curvature a sheet of material in the plastic state, such as a sheet of glass brought to the softening temperature, comprising:
    means for conveying said sheet in a first direction;
    a forming bed comprising a plurality of curved forming rods, said rods having aligned end sections forming respective longitudinal axes and a curved center section extending away from said longitudinal axis;
    means for mounting at least some of said curved rods with their longitudinal axes generally transverse to said first direction and their curved sections inclined at an angle to said first direction, thereby defining a surface that is curved in the direction transverse to said first direction;
    means for mounting the forming rod nearest the upstream side of said forming bed so that an envelope defined by the forming rods is tangential to the surface of said sheet as it enters said forming bed;
    means for mounting said forming rods near the downstream side of said forming bed so that the envelope defined by said rods is curved in the longitudinal direction in which said sheet is moved; and
    means for adjusting the position of the rods which define said curved envelope so as to alter the radius of curvature of said envelope in the longitudinal direction, whereby the radius of curvature of said sheet in the longitudinal direction is also altered.

2. The apparatus of claim 1 characterized in that said forming rods are mounted on leaf springs arranged longitudinally on each side of the forming bed.

3. The apparatus of claim 2 characterized in that the ends of each leaf spring are connected together in such a manner that they can be arched.

4. The apparatus of claim 3 wherein the leaf springs are mounted so that their curvature can be controlled independently and that they can be curved either upward or downward.

5. The apparatus of claim 1 characterized in that the forming rods are mounted on arched bars placed lengthwise on each side of the forming bed.

6. The apparatus of claim 5 characterized in that each arched bar has a "donkey's back" profile and comprises two aligned ends mounted in bearings around which it can turn in such a manner that the longitudinal curvature of the forming bed is changed.

7. The apparatus of claim 5 or claim 6 characterized in that the forming rods are mounted on the arched bars in sliding bearings.

8. The apparatus of claim 1 characterized in that the forming rods are mounted in bearings which move in slides and are vertically adjustable.

9. The apparatus of claim 1 further comprising a plurality of complementary holding means, such as a counter rod and/or rolls, which are spaced apart from said forming rods enough to permit the passage of said sheet therebetween.

10. The apparatus of claim 9 characterized in that each complementary holding means is associated with a forming rod and is pressed elastically toward it.

11. The apparatus of claim 1 wherein the forming rods are arched and the envelope defined by these rods is progressively curved in the transverse and the longitudinal directions.

12. The apparatus of claim 1 characterized in that the forming bed is mounted at least in part inside of a heated enclosure adjoining a glass heating furnace or being part of it.

13. The apparatus of claim 1 further comprising tempering apparatus in which blowing nozzles are interspersed with rods which are identical to the forming rods, said nozzles and rods being mounted on a curve which is a continuation of the curved envelope defined by said forming rods.

14. The apparatus of claim 13 characterized in that the nozzles are mounted perpendicularly to the surface of the sheets that are conveyed past them on the rods.

15. A method for bending and tempering sheets of material in the plastic state, such as a sheet of glass brought to the softening temperature, in which said sheets are heated, bent, and them tempered, said method comprising the steps of:
    heating the sheet to a temperature which is at least equal to the temperature at the start of the tempering step and maintaining said sheet at said temperature for an extended period;
    bending the sheet while the sheet is held at said temperature by moving said sheet through a forming bed comprising a plurality of curved forming rods, said rods having aligned end sections forming respective longitudinal axes and a curved center section, said rods being mounted with their longitudinal axes generally transverse to the direction of movement of said sheets, some of said rods being mounted with their curved sections inclined at an angle to said direction of movement of said sheets and said rods near the downstream end of said forming bed being mounted at different heights with respect to one another, whereby an envelope is defined having a transverse curvature profile and a longitudinal curvature profile that change progressively in the direction of advancement of the sheet; and tempering the sheet immediately after bending by subjecting it to a uniform blowing action.

16. Apparatus for bending to a predetermined transverse and longitudinal curvature a sheet of material in the plastic state, such as a sheet of glass brought to softening temperature, said apparatus comprising:

a series of curved rods which can be positioned to form a curved bed for receiving said sheet, said rods having aligned end sections forming respective axes of rotation of the rods;

means for holding some of said rods at different angles of inclination to the direction of movement of the sheet to provide a fixed bed having a transverse curvature profile which changes progressively in the direction of advancement of the sheet to a curvature corresponding to said predetermined transverse curvature; and means for holding said rods near the downstream end of said bed at an approximately constant angle of inclination to the direction of movement of the sheet but at different heights with respect to one another to provide a fixed bed having a longitudinal curvature profile corresponding to said predetermined longitudinal curvature.

17. The apparatus of claim 16 wherein the rods that are held at different angles are located in a first forming bed and the rods that are held at different heights are located in a second forming bed and the envelope defined by the rods of the first bed is tangential to the envelope defined by the rods of the second bed at an interface between said beds.

18. The apparatus of claim 16 or claim 17 further comprising tempering apparatus in which blowing nozzles are interspersed with rods identical to the forming rods, said nozzles and rods being mounted on a curve which is a continuation of said longitudinal curvature profile.

19. Apparatus for bending to a predetermined curvature a sheet of material in the plastic state, such as a sheet of glass brought to the softening temperature, comprising:

means for conveying said sheet in a first direction;

a forming bed comprising a plurality of curved forming rods mounted in bearings for rotation about respective axes, each of said rods having a curved center section extending away from its axis of rotation;

means for mounting some of said curved rods with their axes of rotation generally transverse to said first direction and their curved sections inclined at increasingly greater angles to said first direction, thereby defining an envelope that is curved in the direction transverse to said first direction and increases in curvature toward the downstream side of said forming bed;

means for mounting the forming rod nearest the upstream side of said forming bed so that said envelope defined by the forming rods is tangential to the surface of said sheet as it enters said forming bed;

means for mounting said forming rods near the downstream side of said forming bed so that the envelope defined by said rods is curved in the longitudinal direction in which said sheet is moved; and means for adjusting the position of the rods which define said curved envelope so as to alter the radius of curvature of said envelope in the longitudinal direction, whereby the radius of curvature of said sheet in the longitudinal direction is also altered.

20. The apparatus of any one of claim 1, 16 and 19 further comprising means for adjusting the position of the rods which define the envelope that is curved in the transverse direction so as to alter the radius of curvature of said envelope in the transverse direction, whereby the radius of curvature of said sheet in the traverse direction is also altered.

21. A method for bending and tempering sheets of material in the plastic state, such as a sheet of glass brought to the softening temperature, in which said sheets are heated, bent, and then tempered, said method comprising the steps of:

heating the sheet to a temperature which is at least equal to the temperature at the start of the tempering step and maintaining said sheet at said temperature for an extended period;

simultaneously bending the sheet in two directions while the sheet is held at said temperature by moving said sheet through a forming bed comprising a plurality of curved forming rods, each of which is mounted in bearings for rotation about an axis and has a curved center section extending away from said axis of rotation, some of said rods being mounted with their curved sections inclined at an angle to said direction of movement of said sheets, whereby said sheets are curved in the direction transverse to their movement, and some of said rods being mounted at different heights with respect to one another, whereby said sheets are curved in the direction of their movement; and tempering the sheet immediately after bending by subjecting it to a uniform blowing action.

22. A method for bending and tempering sheets of material in the plastic state, such as a sheet of glass brought to the softening temperature, in which said sheets are heated, bent, and then tempered, said method comprising the steps of:

heating the sheet to a temperature which is at least equal to the temperature at the start of the tempering step and maintaining said sheet at said temperature for an extended period;

bending the sheet under its own weight in two directions while the sheet is held at said temperature by moving said sheet through a forming bed comprising a plurality of curved forming rods, each of which is mounted in bearings for rotation about an axis and has a curved center section extending away from said axis of rotation, some of said rods being mounted with their curved sections inclined at an angle to said direction of movement of said sheets, whereby said sheets are curved in the direction transverse to their movement, and some of said rods being mounted at different heights with respect to one another, whereby said sheets are curved in the direction of their movement; and tempering the sheet immediately after bending by subjecting it to a uniform blowing action.

23. A method for bending and tempering sheets of material in the plastic state, such as a sheet of glass brought to the softening temperature, in which said sheets are heated, bent, and then tempered, said method comprising the steps of:

heating the sheet to a temperature which is at least equal to the temperature at the start of the tempering step and maintaining said sheet at said temperature for an extended period;

bending the entire sheet simultaneously to increasingly greater curvature while the sheet is held at said temperature by moving said sheet through a forming bed comprising a plurality of curved forming rods, each of which is mounted in bearings for rotation about an axis and has a curved center section extending away from said axis of rotation, some of said rods being mounted with their curved sections inclined at an angle to said direction of movement of said sheets, whereby said sheets are curved in the direction transverse to their movement, and some of said rods being mounted at different heights with respect to one another, whereby said sheets are curved in the direction of their movement; and tempering the sheet immediately after bending by subjecting it to a uniform blowing action.

24. The method of any one of claims 15, 21, 22 and 23 wherein the curved forming rods are inclined so that their curved sections are raised upwards and the rods near the downstream end of the bed are progressively lower in height and the glass sheet is bent downward at its edges as the sheet sags under its own weight.

25. The method of claim 15 wherein the step of tempering the sheet comprises the step of moving the sheet through a series of blowing nozzles and carrying rods which are mounted on a longitudinal curve which is a continuation of the longitudinal curvature produced in the bending step.

* * * * *